United States Patent
Fu et al.

(10) Patent No.: US 12,541,126 B2
(45) Date of Patent: Feb. 3, 2026

(54) DISPLAY MODULE, SPLICED SCREEN AND DISPLAY APPARATUS

(71) Applicants: BEIJING BOE DISPLAY TECHNOLOGY CO., LTD., Beijing (CN); BOE TECHNOLOGY GROUP CO., LTD., Beijing (CN)

(72) Inventors: Changjia Fu, Beijing (CN); Zhuang Xu, Beijing (CN); Haijun Shi, Beijing (CN); Shanlei Hou, Beijing (CN); Bochang Wang, Beijing (CN); Wei Zhong, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 223 days.

(21) Appl. No.: 18/575,078

(22) PCT Filed: May 31, 2022

(86) PCT No.: PCT/CN2022/096356
§ 371 (c)(1),
(2) Date: Dec. 28, 2023

(87) PCT Pub. No.: WO2023/230879
PCT Pub. Date: Dec. 7, 2023

(65) Prior Publication Data
US 2024/0353709 A1    Oct. 24, 2024

(51) Int. Cl.
*G02F 1/1333* (2006.01)
*G02F 1/1335* (2006.01)
*G02F 1/13357* (2006.01)

(52) U.S. Cl.
CPC .... *G02F 1/13336* (2013.01); *G02F 1/133331* (2021.01); *G02F 1/133528* (2013.01); *G02F 1/133603* (2013.01); *G02F 1/133606* (2013.01)

(58) Field of Classification Search
CPC ........... G02F 1/13336; G02F 1/133331; G02F 1/133603; G02F 1/133606
See application file for complete search history.

(56) References Cited

U.S. PATENT DOCUMENTS

2015/0362657 A1* 12/2015 Wang ................... G09G 3/3258
345/82
2017/0192136 A1    7/2017 Tsai et al.
(Continued)

FOREIGN PATENT DOCUMENTS

CN    102708840 A    10/2012
CN    102945644 A    2/2013
(Continued)

*Primary Examiner* — Jia X Pan
(74) *Attorney, Agent, or Firm* — LEASON ELLIS LLP (57) ABSTRACT

Embodiments of the present disclosure provide a display module, a splicing screen and a display apparatus, which includes: at least two main display regions and a splicing display region, at least a part of the splicing display region is between two adjacent main display regions on a side of a light-emitting surface of the display module; a first type display panel is in the splicing display region, a second type display panel is in the main display regions; on the side of the light-emitting surface of the display module, at least a cover plate is on the first type display panel, a surface of the cover plate close to the first type display panel includes a first surface protruding to a side away from the first type display panel, a surface of the cover plate away from the first type display panel is a flat second surface.

19 Claims, 6 Drawing Sheets

(56) References Cited

U.S. PATENT DOCUMENTS

2020/0310179 A1   10/2020  Lentz
2024/0028286 A1    1/2024  Xiao et al.
2024/0221604 A1*  7/2024  Hu ........................... G09G 3/32

FOREIGN PATENT DOCUMENTS

| CN | 104035233 | A |   | 9/2014  |            |
|----|-----------|---|---|---------|------------|
| CN | 105044964 | A |   | 11/2015 |            |
| CN | 107610596 | A |   | 1/2018  |            |
| CN | 111653207 | A |   | 9/2020  |            |
| CN | 113053261 | A |   | 6/2021  |            |
| CN | 214669956 | A |   | 11/2021 |            |
| CN | 215577444 | U |   | 1/2022  |            |
| CN | 114038340 | A |   | 2/2022  |            |
| CN | 114185506 | A |   | 3/2022  |            |
| CN | 114241937 | A | * | 3/2022  | G09F 9/3026 |
| WO | 2019205414 | A1 |  | 10/2019 |            |

* cited by examiner

DISPLAY MODULE, SPLICED SCREEN AND DISPLAY APPARATUS

CROSS-REFERENCE TO RELATED PATENT APPLICATIONS

This application is a U.S. National Stage Application under 35 U.S.C. § 371 of International Patent Application No. PCT/CN2022/096356 filed May 31, 2022, which is incorporated by reference in its entirety.

TECHNICAL FIELD

Embodiments of the present disclosure relates to a display module, a splicing screen and a display apparatus.

BACKGROUND

At present, a production line of a liquid crystal display panel can realize a size of the liquid crystal display panel produced to reach a size of a 8.5 generation glass substrate, the size of the 8.5 generation glass substrate is 220 cm×250 cm, which can achieve the preparation of the LCD display panel with a maximum size of 110 inches, and the glass substrate is easy to be broken during the preparation of the liquid crystal display panel, that is, an utilization rate of the glass substrate is low. For the preparation of a large-size liquid crystal display panel with a size larger than 110 inches, the current production line cannot be directly implemented. Therefore, under a premise of not increasing the size of the glass substrate, it is necessary to adopt a splicing method to achieve the preparation of the large-size liquid crystal display panel.

In an actual production process, it is found that due to restrictions of factors such as frame sealing glue, glass cutting tolerance, peripheral routing and so on, an obvious splicing seam may exist at a splicing position of the liquid crystal display panel, and the existence of the splicing seam greatly affects a display effect of a finally formed splicing display apparatus.

SUMMARY

At least one embodiment of the present disclosure relates to a display module, a splicing screen and a display apparatus, the display module is provided with a cover plate at least on the first type display panel, and the surface of the cover plate close to the first type display panel includes a first surface protruding towards the side away from the first type display panel, the surface of the cover plate away from the first type display panel is a flat second surface, and the arrangement of the cover plate can adjust the visual angle of the display module, and the flat second surface of the cover plate can also make the appearance of the final formed display apparatus more beautiful.

At least one embodiment of the present disclosure provides a display module, and the display module includes: at least two main display regions and a splicing display region, at least a part of the splicing display region is located between two of the main display regions adjacent to each other on a side of a light-emitting surface of the display module; a first type display panel is arranged in the splicing display region, and a second type display panel is arranged in the main display regions; on the side of the light-emitting surface of the display module, at least a cover plate is arranged on the first type display panel, and a surface of the cover plate close to the first type display panel comprises a first surface protruding to a side away from the first type display panel, and a surface of the cover plate away from the first type display panel is a flat second surface.

For example, in the display module provided by at least one embodiment of the present disclosure, the display module further comprises a first polarizer and a backlight module, the first polarizer is on a side of the second type display panel close to the light-emitting surface of the display module, and the backlight module is on a side of the second type display panel away from the first polarizer.

For example, in the display module provided by at least one embodiment of the present disclosure, roughness of the second surface is the same as roughness of the first polarizer.

For example, in the display module provided by at least one embodiment of the present disclosure, the first polarizer has a smooth structure, and the second surface is a smooth plane.

For example, in the display module provided by at least one embodiment of the present disclosure, the first polarizer is a structure with a haze, and the second surface is a flat plane with frosting.

For example, in the display module provided by at least one embodiment of the present disclosure, the cover plate further covers the second type display panel.

For example, in the display module provided by at least one embodiment of the present disclosure, the cover plate is provided with a diffusing agent, the diffusing agent is configured to adjust white light chromaticity of the first type display panel and a haze of a display picture.

For example, in the display module provided by at least one embodiment of the present disclosure, a material of the diffusing agent comprises at least one of organosilane and silicon dioxide.

For example, in the display module provided by at least one embodiment of the present disclosure, the first surface is a surface with a circular arc, the smaller a radius of the circular arc, the greater an angle between emitting light and a direction perpendicular to a light-emitting surface of the first type display panel.

For example, in the display module provided by at least one embodiment of the present disclosure, the radius of the circular arc is 3 mm to 10 mm.

For example, in the display module provided by at least one embodiment of the present disclosure, an average thickness of the cover plate is 1 mm to 2 mm in a direction perpendicular to the light-emitting surface of the display module.

For example, in the display module provided by at least one embodiment of the present disclosure, the first type display panel comprises a driving circuit and a light-emitting device, the light-emitting device is arranged on the side of the light-emitting surface of the display module, the driving circuit is arranged on a side opposite to the light-emitting surface, and the driving circuit is configured to drive the light-emitting device to emit light.

For example, in the display module provided by at least one embodiment of the present disclosure, the light-emitting device comprises at least one of Micro LED, Mini LED and Mini OLED.

For example, in the display module provided by at least one embodiment of the present disclosure, the second type display panel is a liquid crystal display panel.

For example, in the display module provided by at least one embodiment of the present disclosure, the light-emitting device is a Mini LED, in a first direction parallel to the light-emitting surface of the display module, a width of each pixel unit in the first type display panel is 1 time to 2 times of a width of each pixel unit in the second type display panel.

For example, in the display module provided by at least one embodiment of the present disclosure, in the first direction, the width of each pixel unit in the first type display panel is twice the width of each pixel unit in the second type display panel.

For example, in the display module provided by at least one embodiment of the present disclosure, in the first direction, the width of each pixel unit in the first type display panel is a distance that subtract 0.1 mm to 0.5 mm from the distance between two of the second type display panels adjacent to each other in the first direction.

For example, in the display module provided by at least one embodiment of the present disclosure, each pixel unit in the first type display panel comprises a plurality of sub-pixels, and a distance between two adjacent second type display panels in the first direction is 2 to 5 times a width of the sub-pixel in the first direction plus 0.2 mm to 0.6 mm.

For example, in the display module provided by at least one embodiment of the present disclosure, the Mini LED comprises a red chip, a green chip and a blue chip, and the blue chip has a same main wavelength as the backlight module in the second type display panel.

For example, in the display module provided by at least one embodiment of the present disclosure, a wavelength of the red chip is 620 nm to 650 nm, a wavelength of the green chip is 520 nm to 550 nm, and a wavelength of the blue chip is 440 nm to 470 nm.

For example, in the display module provided by at least one embodiment of the present disclosure, a current value of the red chip:a current value of the green chip:a current value of the blue chip is 1~1.8:0.8~1.2:0.9~1.4.

For example, in the display module provided by at least one embodiment of the present disclosure, the current value of the red chip:the current value of the green chip:the current value of the blue chip is 1.6:1:1.15.

For example, in the display module provided by at least one embodiment of the present disclosure, the light-emitting device is a Micro LED or a Mini OLED, in a first direction parallel to the light-emitting surface of the display module, a width of each pixel unit in the first type display panel is equal to a width of each pixel unit in the second type display panel, and sub-pixels in the light-emitting device correspond to sub-pixels in the second type display panel one by one.

At least one embodiment of the present disclosure further provides a splicing screen, and the splicing screen comprises a plurality of connected display modules as described in any one of the embodiments mentioned above.

For example, in the splicing screen provided by at least one embodiment of the present disclosure, a width direction of each pixel unit in the first type display panel is a first direction, and an extension direction of a splicing seam between adjacent second type display panels is a second direction, along the second direction, the first type display panel is divided into a plurality of first type sub-display units, a length of each first type sub-display unit in the second direction is 50 mm to 150 mm.

For example, in the splicing screen provided by at least one embodiment of the present disclosure, the first type display panel is arranged around the splicing screen.

At least one embodiment of the present disclosure further provides a display apparatus, and the display apparatus includes the display module described in any one of the embodiments mentioned above.

BRIEF DESCRIPTION OF DRAWINGS

In order to more clearly explain the technical solutions of the embodiments of the present disclosure, the following will briefly introduce the drawings of the embodiments, obviously, the drawings in the following descriptions only relate to some embodiments of the present disclosure, but not limit the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or mechanical connection, but may include an electrical connection, directly or indirectly. "On," "under," "left," "right" and the like are only used to indicate relative position relationship, and when the position of the object which is described is changed, the relative position relationship may be changed accordingly.

Usually, a large-screen splicing display apparatus is formed by splicing liquid crystal display panels (Liquid Crystal Display, LCD). In a process of producing the liquid crystal display panel, a frame sealing glue is adopted to seal the liquid crystal in a specific region, but a position where the frame sealing glue is located cannot display, and factors such as glass cutting tolerance, peripheral routing, etc. will further cause an edge portion of the liquid crystal display panel cannot display, so in a case where the liquid crystal display panel is used to make a splicing display apparatus, a wide non-display region will exist between display regions of adjacent liquid crystal display panels, and the wide non-display region will cause that an obvious splicing seam exists in the splicing display apparatus, which will destroy continuity of display picture in a case where the large-screen splicing display apparatus is displaying, thereby greatly affecting a display effect of the large-screen splicing display apparatus.

An inventor of the present disclosure noticed that a light-emitting diode device can be formed in the splicing seam, so that the position of the splicing seam can also display, but this structural design will cause a large decrease in brightness of the light-emitting diode in a case of being viewed at a large viewing angle, and a viewing angle is small and the display effect is poor, and a surface of the light-emitting diode device formed in the splicing seam has no protective structure, which is prone to cause problems such as the light-emitting diode device being damaged due to a scratch or a collision to the light-emitting diode device, and therefore, a reliability of a finally formed large-screen splicing display apparatus will be affected. In addition, after the light-emitting diode device is formed in the splicing seam, a chromaticity of the light-emitting diode device will not match that of the liquid crystal display panel, so that the display pictures cannot be integrated as a whole, and the display picture has obvious abruptness. Therefore, the inventor of the present disclosure noticed that a cover plate can be formed above the light-emitting diode device, and a surface of the cover plate close to the LED device is designed to protrude toward a side away from the LED device, so that the viewing angle of the finally formed display apparatus becomes larger to improve the display effect of the display apparatus. Moreover, the cover plate can further prevent the light-emitting diode device from being scratched or collided by an external rigid substance that may cause the light-emitting diode device to be damaged, so as to protect the light-emitting diode device, and a diffusing agent can further be added to the cover plate to improve a white light chromaticity and a haze of the display picture of the light-emitting diode device, so that the display picture of the light-emitting diode device can be better matched with the display picture of the liquid crystal display panel.

At least one embodiment of the present disclosure provides a display module, and the display module includes: at least two main display regions and a splicing display region, at least a part of the splicing display region is located between two of the main display regions adjacent to each other on a side of a light-emitting surface of the display module, a first type display panel is arranged in the splicing display region, and a second type display panel is arranged in the main display regions, on the side of the light-emitting surface of the display module, at least a cover plate is arranged on the first type display panel, and a surface of the cover plate close to the first type display panel comprises a first surface protruding to a side away from the first type display panel, and the first surface of the cover plate is arranged to protrude to the side away from the light-emitting diode device, and a surface of the cover plate away from the first type display panel, that is, a second surface is arranged as a flat surface, which can increase the viewing angle of the finally formed display apparatus, thereby improving the display effect of the display apparatus.

Figure 1:
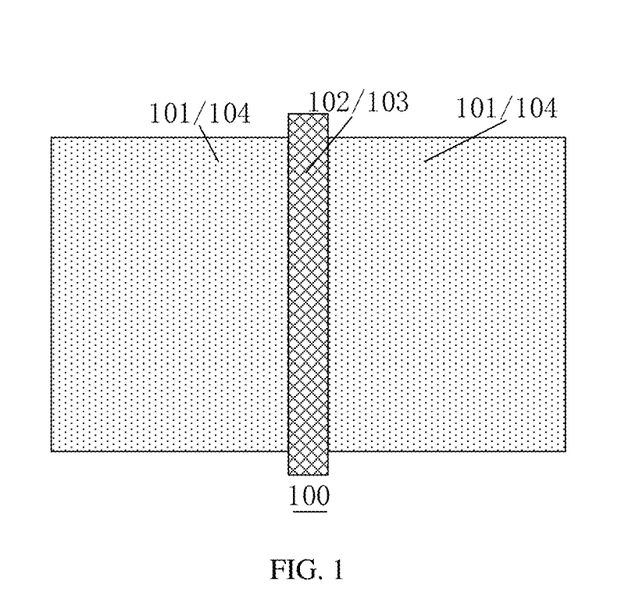
FIG. 1 is a plane structure schematic diagram of a display module provided by at least one embodiment of the present disclosure.
Figure 2:
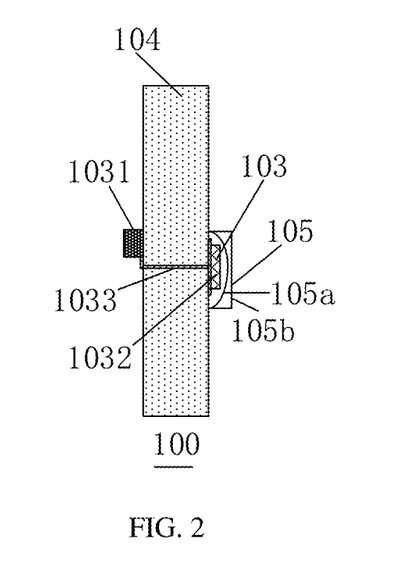
FIG. 2 is a cross-sectional schematic diagram of a display module provided by at least one embodiment of the present disclosure.

For example, FIG. 1 is a plane structure schematic diagram of a display module provided by at least one embodiment of the present disclosure, and FIG. 2 is a cross-sectional schematic diagram of a display module provided by at least one embodiment of the present disclosure, combining FIG. 1 and FIG. 2, a display module 100 includes: at least two main display region 101 and a splicing display region 102, on a side of a light-emitting surface of the display module 100, at least a part of the splicing display region 102 is located between two of the main display regions 101 adjacent to each other, a first type display panel 103 is arranged in the splicing display region 101, and a second type display panel 104 is arranged in the main display regions 101, on the side of the light-emitting surface of the display module 100, a cover plate 105 is at least provided on the first type display panel 103, and a surface of the cover plate 105 close to the first type display panel 103 includes a first surface 105a protruding to a side away from the first type display panel 103, and a surface of the cover plate 105 away from the first type display panel 103 is a flat second surface 105b. For example, the first surface 105a may be a part or all of the surface of the cover plate 105 close to the first type display panel 103, that is, an entire surface of the cover plate 105 close to the first type display panel 103 protrudes to the side away from the first type display panel 103, or a part of the surface of the cover plate 105 close to the first type display panel 103 protrudes to the side away from the first type display panel 103, and another part of the surface of the cover plate 105 close to the first type display panel 103 remains flat. In a structure illustrated in FIG. 2, the entire surface of the cover plate 105 close to the first type display panel 103 protrudes to the side away from the first type display panel 103, so that the entire cover plate 105 can realize an adjustment of the size of the viewing angle of the display module 100, and because the surface of the cover plate 105 away from the first type display panel 103 is the flat second surface 105b, the entire cover plate 105 can make the viewing angle of the display module 100 be increased, and the flat second surface 105b can further make an appearance of the final formed display apparatus more beautiful.

For example, in the plane diagram illustrated in FIG. 1, in a longitudinal direction, the first type display panel 103 extends beyond the second type display panel 104, so that the first type display panel 103 can cover an edge of a black matrix region of the second type display panel 104, so that an uniformity of the picture displayed by the entire display apparatus is higher. Although it cannot be seen from the plane diagram illustrated in FIG. 1, in fact, in a direction perpendicular to a paper, the first type display panel 103 protrudes from the second type display panel 104, even if a structure of the second type display panel 104 exists in the splicing display region 102, but the second type display panel 104 cannot display at the splicing display region 102, and therefore it is equivalent to that the second type display panel 104 raises the first type display panel 103, so that the first type display panel 103 can protrude from the second type display panel 104.

For example, after a light-emitting element of a Micro LED is produced, it is usually necessary to use a mass transfer technology to transfer a large number of the light-emitting elements of the Micro LED to an array layer, so that each light-emitting element of the Micro LED can display independently. However, a size of the Micro LED is very small, and the mass transfer of tens of thousands or even hundreds of thousands of the light-emitting elements of the Micro LED is not only difficult in process, but also very expensive. In addition, phenomena such as afterimage flickering may appear in a case where a Micro OLED display panel is used for a long time, and a quantity production of the large-size display panels cannot be realized, and therefore, the liquid crystal display panel is usually used as the second type display panel with a larger size, and a Mini LED, a Micro LED or a Mini OLED is used to produce the first type display panel, and then the first type display panel is spliced with the second type display panel to realize a display module of any sizes, the display module can not only effectively weaken or eliminate the splicing seam, but also is beneficial to reduce a production cost of the display module, and at the same time, service life of the display module can be prolonged. Moreover, in a case where the Mini LED, the Micro LED or the Mini OLED is used to produce the first type display panel, the first display panel has advantages of high brightness, low power consumption, high and low temperature resistance, and can effectively prolong the service life of the display module 100.

For example, the first type display panel 103 and the second type display panel 104 are different types of display panels. In one example, the first type display panel 103 is a light-emitting diode display panel, the second type display panel 104 is a liquid crystal display panel, and the light-emitting diode display panel can be further selected to have different types of light-emitting diode display panels, for example, at least one of a Micro LED display panel, a Mini LED display panel and a Mini OLED display panel can be selected, which is not limited in the embodiments of the present disclosure. Following embodiments are described by taking that the first type display panel 103 is a Mini LED display panel and the second type display panel 104 is a liquid crystal display panel as an example, a display region of the second type display panel 104 (liquid crystal display panel) corresponds to the main display region 101, a display region of the first type display panel 103 (Mini LED display panel) corresponds to the splicing display region 102, so that a position of the splicing seam between two adjacent second type display panels 104 can actively emit light, so that the splicing seam between two adjacent second type display panels 104 can be eliminated, thereby the finally formed display apparatus can display a continuous display picture.

Although only two second type display panels 104 are illustrated in FIG. 1, according to a selection of actual conditions and a specific requirement arrangement, the finally formed display apparatus may include more second type display panels 104, and all second type display panels 104 are distributed in an array.

For example, as illustrated in FIG. 2, the first type display panel 103 includes a driving circuit 1031 and a light-emitting device 1032, the light-emitting device 1032 is arranged on a side of the light-emitting surface of the display module 100, and the driving circuit 1031 is arranged on a side opposite to the light-emitting surface, the driving circuit 1031 is configured to drive the light-emitting device 1032 to emit light. By arranging the driving circuit 1031 on the side opposite to the light-emitting surface, the driving-circuit 1031 cannot occupy a position of the light-emitting surface of a finally formed display module, so that the display efficiency of the display module is improved.

For example, as illustrated in FIG. 2, the driving circuit 1031 and the second type display panel 104 have an overlapping region.

For example, as illustrated in FIG. 2, the first type display panel 103 further includes a circuit board 1033 connecting the driving circuit 1031 with the light-emitting device 1032. The circuit board 1033 may be a flexible circuit board, so that it can be bent. A part of the circuit board 1033 extends on a side surface of the display apparatus, so that the circuit board 1033 does not occupy the position of the light-emitting surface of the display module, so as to improve the display efficiency.

Figure 3:
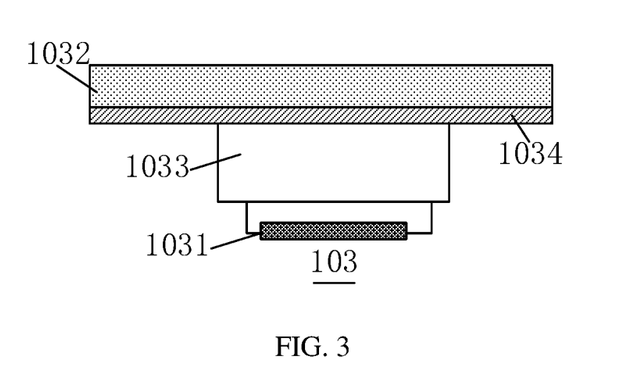
FIG. 3 is a circuit connection schematic diagram of a first type display panel provided by at least one embodiment of the present disclosure.

For example, FIG. 3 is a circuit connection schematic diagram of a first type display panel provided by at least one embodiment of the present disclosure. As illustrated in FIG. 3, the circuit board 1033 is connected with the light-emitting device 1032 by a first adhesive glue 1034, the driving circuit 1031 is connected to the circuit board 1033, the first adhesive glue 1034 may be an OCR optical glue, a heat-sensitive glue or a double-sided glue, which is not limited in the embodiments of the present disclosure.

Figure 4:
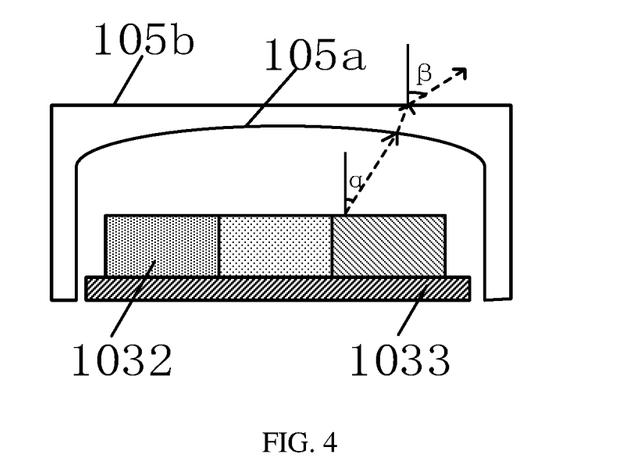
FIG. 4 is a cross-sectional structure schematic diagram of a region with a cover plate in FIG. 3.

For example, FIG. 4 is a cross-sectional structure schematic diagram of a region with a cover plate in FIG. 3, as illustrated in FIG. 4, the entire surface of the cover plate 105 close to the first type display panel 103 protrudes to the side away from the first type display panel 103, that is, a whole of the first surface 105a protrudes to the side away from the first type display panel 103, and the second surface 105b of the cover plate 105 is a flat surface. An included angle between light emitted from the light-emitting device 1032 and a direction perpendicular to the light-emitting surface of the first-type display panel 103 is a first included angle α, an included angle of light emitted from the second surface 105b of the cover plate 105 and the direction perpendicular to the light-emitting surface of the first-type display panel 103 is a second included angle β, and the second included angle β is larger than the first included angle α, so that the viewing angle of the finally formed display module becomes larger.

Figure 5:
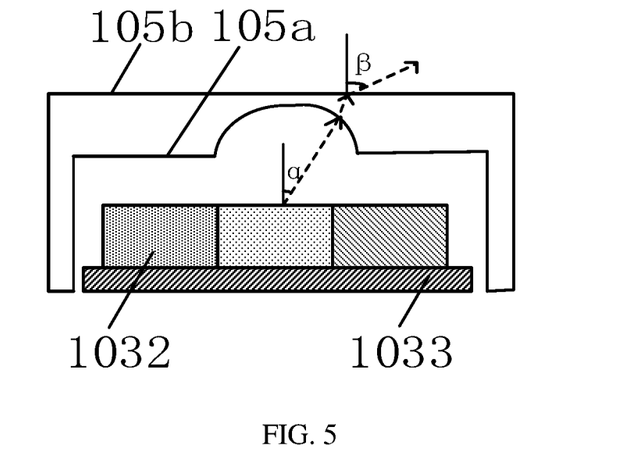
FIG. 5 is a cross-sectional structure schematic diagram of another region with a cover plate provided by at least one embodiment of the present disclosure.

For example, FIG. 5 is a cross-sectional structure schematic diagram of another region with a cover plate provided by at least one embodiment of the present disclosure, as illustrated in FIG. 5, a part of the surface of the cover plate 105 close to the first type display panel 103 protrudes to the side away from the first type display panel 103, another part of the surface of the cover plate 105 close to the first type display panel 103 remains flat. It should be noted that only the first surface 105a illustrated in FIG. 5 protrudes to the side away from the first type display panel 103 at a middle part of the cover plate 105, and parts of the cover plate 105 at two sides remain flat. Embodiments of the present disclosure are not limited to this, for example, the parts of the cover plate 105 at two sides may protrude to the side away from the first type display panel 103, and the middle part remains flat, which is not limited in the embodiments of the present disclosure. In structure illustrated in FIG. 5, an included angle between light emitted from the light-emitting device 1032 and a direction perpendicular to the light-emitting surface of the first-type display panel 103 is a first included angle α, an included angle of light emitted from the second surface 105b of the cover plate 105 and the direction perpendicular to the light-emitting surface of the first-type display panel 103 is a second included angle β, and the second included angle β is larger than the first included angle α, so that the viewing angle of the finally formed display module becomes larger.

It should be noted that, the first surface 105a that protrudes to the side away from the first type display panel 103 is not limited to an arc-shaped protrusion, and may further be a protrusion with a cross-sectional shape of a triangular, which is not limited in the embodiments of the present disclosure, as long as the first included angle between light emitted from the light-emitting device 1032 and a direction perpendicular to the light-emitting surface of the first-type display panel 103 is smaller than the second included angle between light emitted from the second surface 105b of the cover plate 105 and the direction perpendicular to the light-emitting surface of the first-type display panel 103.

For example, as illustrated in FIG. 4 and FIG. 5, the first surface 105a is a surface with a circular arc, and the surface of the cover plate 105 away from the first type display panel 103 is a flat second surface 105b, a structure of the cover plate 105 with the circular arc makes that the second included angle between the light emitted on the cover plate 105 and emitting from the second surface 105b and the direction perpendicular to the light-emitting surface of the first type display panel 103, can change relative to the first included angle between the light emitted on the cover plate 105 and the direction perpendicular to the light-emitting surface of the first type display panel 103, that is, the second included angle is larger than the first included angle. It can be seen from FIG. 4 and FIG. 5 that, the smaller a radius of the circular arc, the larger the included angle between the light emitted from the second surface 105b of the cover plate 105 and the direction perpendicular to the light-emitting surface of the first type display panel 103, for example, a radius of the circular arc in FIG. 4 is greater than a radius of the circular arc in FIG. 5, so that the second included angle between the light emitted from the second surface 105b of the cover plate 105 and the direction perpendicular to the light-emitting surface of the first type display panel 103 illustrated in FIG. 4 is smaller than the second included angle between the light emitted from the second surface 105b of the cover plate 105 and the direction perpendicular to the light-emitting surface of the first type display panel 103 illustrated in FIG. 5.

For example, the smaller the radius of the circular arc of the first surface 105a of the cover plate 105, the greater a thickness of the cover plate 105, which may be an average thickness of the cover plate 105, which will cause a greater height that the cover plate 105 protrudes to the second type display panel 104, and as a result, the appearance of the finally formed display apparatus will be affected, and therefore, in a case of designing the structure of the cover plate 105, it is necessary to comprehensively consider the thickness of the cover plate 105 and the viewing angle of the finally formed display apparatus. For example, in one example, the radius of the circular arc of the first surface 105a of the cover plate 105 is 3 mm to 10 mm.

For example, in an example, the radius of the circular arc of the first surface 105a of the cover plate 105 is 3 mm, 4 mm, 5 mm, 6 mm, 7 mm, 8 mm, 9 mm or 10 mm.

For example, as illustrated in FIG. 2 and FIG. 3, in the direction perpendicular to the light-emitting surface of the display module 100, an average thickness of the cover plate 105 is 1 mm to 2 mm. For example, the average thickness of the cover plate 105 is 1 mm, 1.2 mm, 1.4 mm, 1.6 mm, 1.8 mm or 2 mm, and the radius of the circular arc of the first surface 105a of the cover plate 105 and the thickness of the cover plate 105 need to be considered comprehensively.

For example, in one example, the radius of the circular arc of the first surface 105a of the cover plate 105 is 3 mm, and the average thickness of the cover plate 105 is 1 mm; or, the radius of the circular arc of the first surface 105a of the cover plate 105 is 4 mm, and the average thickness of the cover plate 105 is 1.2 mm; the radius of the circular arc of the first surface 105a of the cover plate 105 is 5 mm, and the average thickness of the cover plate 105 is 1.4 mm; the radius of the circular arc of the first surface 105a of the cover plate 105 is 6 mm, and the average thickness of the cover plate 105 is 1.6 mm; the radius of the circular arc of the first surface 105a of the cover plate 105 is 7 mm, and the average thickness of the cover plate 105 is 1.6 m; the radius of the circular arc of the first surface 105a of the cover plate 105 is 8 mm, and the average thickness of the cover plate 105 is 1.8 mm; the radius of the circular arc of the first surface 105a of the cover plate 105 is 9 mm, and the average thickness of the cover plate 105 is 1.8 mm; the radius of the circular arc of the first surface 105a of the cover plate 105 is 10 mm, and the average thickness of the cover plate 105 is 2.0 mm.

Figure 6:
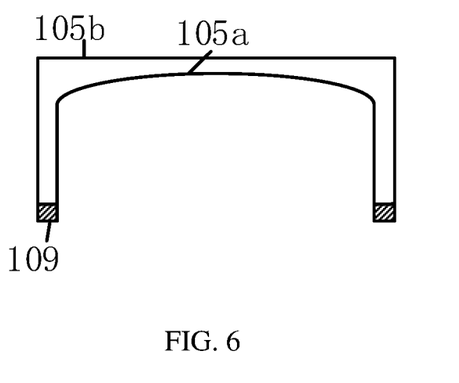
FIG. 6 is a cross-sectional structure schematic diagram of a cover plate and a second adhesive provided by at least one embodiment of the present disclosure.

For example, FIG. 6 is a cross-sectional structure schematic diagram of a cover plate and a second adhesive provided by at least one embodiment of the present disclosure, as illustrated in FIG. 6, the cover plate 105 can be formed on a side of the light-emitting surface of the display panel 103 by second adhesive glue 109. For example, in one example, the OCA optical glue is attached to a back surface of the cover plate 105, the OCA optical glue can make the cover plate 105 be bonded together to an edge of the second type display panel 104, and finally forms a complete display module structure. In addition to the OCR optical glue, the second adhesive glue 109 can further be a heat-sensitive glue or a double-sided glue, as long as the second adhesive glue 109 has characteristics of adhesive performance and light transmission, which is not limited in the embodiments of the present disclosure.

Figure 7:
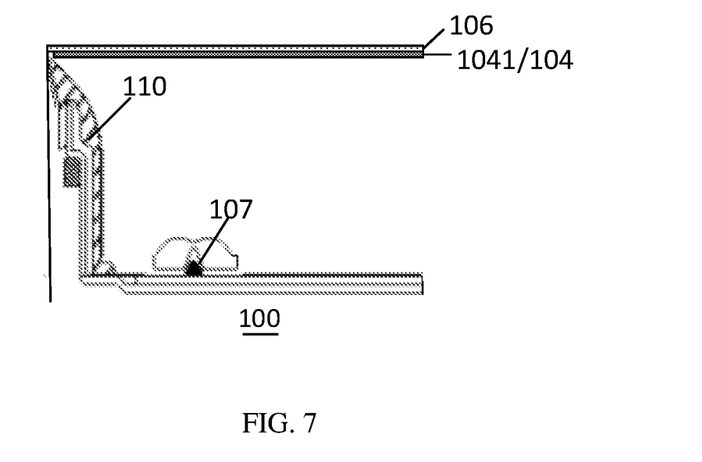
FIG. 7 is a cross-sectional structure schematic diagram of another display module provided by at least one embodiment of the present disclosure.

For example, FIG. 7 is a cross-sectional structure schematic diagram of another display module provided by at least one embodiment of the present disclosure, as illustrated in FIG. 7, the cross-sectional structure schematic diagram is obtained by cutting at a position where the second type display panel 104 is located, the display module 100 further includes a first polarizer 106 and a backlight module 107, the first polarizer 106 is on a side of the second type display panel 104 close to the light-emitting surface of the display module 100, and the backlight module 107 is on a side of the second type display panel 104 away from the first polarizer 106. The backlight module 107 can provide backlight for the second type display panel 104, and the backlight module 107 can be a light-emitting diode emitting blue light. The first polarizer 106 can polarize the light emitted from the second type display panel 104.

For example, as illustrated in FIG. 7, the display module 100 further includes a middle frame 110, the second type display panel 104 includes a liquid crystal cell 1041, the first polarizer 106 is arranged on a main surface of the liquid crystal cell 1041, and the middle frame 110 is arranged on a side of the liquid crystal cell 1041 away from the first polarizer 106.

It should be noted that the liquid crystal cell 1041 has two main surfaces, one of the main surfaces is a display surface, and another main surface is a surface opposite to the display surface, and the first polarizer 102 is arranged on the display surface of the liquid crystal cell 1041.

For example, other structures of the second type display panel 104 illustrated in FIG. 7, for example, the middle frame, a back plane, and the liquid crystal cell, may refer to conventional designs, and details are not repeated herein.

For example, in one example, roughness of the second surface 105b of the cover plate 105 is the same as roughness of the first polarizer 106, and this design makes an effect of light exiting from the second type display panel 104 and then passing through the first polarizer 106 is the same as an effect of light exiting from the first type display panel 103 and then passing through the cover plate 105, that is, the cover plate 105 will not affect chromaticity of the first type display panel 103.

For example, in one example, the first polarizer 106 has a smooth structure, and the second surface 105b of the cover plate 105 is a smooth plane, so that in a case where light is emitted from the first type display panel 103 and then passes through the cover plate 105, the cover plate 105 will not affect the haze of emitted light, so as to have the same haze effect as in a case where light is emitted from the second type display panel 104 and then passes through the first polarizer 106.

For example, in one example, the first polarizer 106 is a structure with a haze, and the second surface 105b of the cover plate 105 is a flat plane with frosting, and the frosting structure can change the haze of the second surface 105b of the cover plate 105, so that an effect of light emitted from the second type display panel 104 and then passes through the first polarizer 106 is the same as that of light emitted from the first type display panel 103 and then passes through the cover plate 105.

Figure 8:
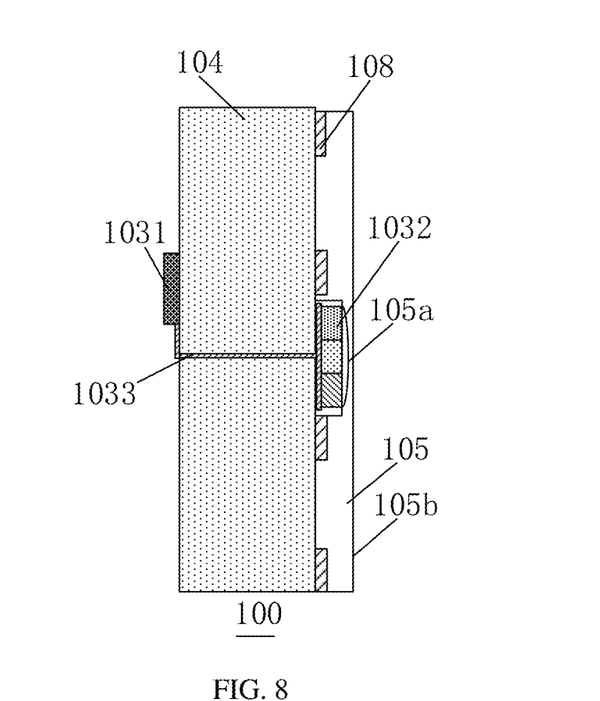
FIG. 8 is a cross-sectional structure schematic diagram of another display module provided by at least one embodiment of the present disclosure.

For example, FIG. 8 is a cross-sectional structure schematic diagram of another display module provided by at least one embodiment of the present disclosure. As illustrated in FIG. 8, the cover plate 105 further covers the second type display panel 104, and the cover plate 105 is an integral structure which covers the entire light-emitting surface of the display module, that is, the integral structure of the cover plate 105 covers at least one first type display panel 103 and two second type display panels 104.

For example, as illustrated in FIG. 8, the cover plate 105 with the integrated structure makes that a light-emitting surface where the light emitted from the first type display panel 103 and a light-emitting surface where the light emitted from the second type display panel 104 are on the same plane, that is, both are the second surface 105b of the cover plate 105, the appearance and the picture of the first type display panel 103 and the appearance and the picture of the second type display panel 104 are on the same plane, so that a visual effect of the display picture to a user is better.

For example, in the structure illustrated in FIG. 8, the arrangement of the cover plate 105 can reduce abruptness of the appearance of the display module, and an edge of the cover plate 105 is bonded with double-sided glue, and the cover plate 105 can be connected with the second type display panel 104 through the double-sided glue, so as to achieve a purposes of firm fixing, and easy assembly and disassembly, and the like.

For example, in an example, the cover plate 105 is provided with a diffusing agent, the diffusing agent is configured to adjust the white light chromaticity of the first type display panel 103 and the haze of the display picture. Difference materials of the cover plate 105 and difference concentration of the diffusing agent added in the cover plate 105 will have a certain impact on the chromaticity of the first type display panel 103, and therefore the white light chromaticity of the first type display panel 103 and the picture haze effect of the light-emitting surface can be adjusted through the material of the cover plate 105 and the diffusing agent added in the cover plate 105, so that the chromaticity of the first type display panel 103 can matches with the chromaticity of the second type display panel 104.

It should be noted that, the design of adding the diffusing agent to the cover plate 105 can be applied to any one of the above-mentioned embodiments to adjust the white light chromaticity of the first type display panel 103 and the haze effect of the picture of the light-emitting surface.

For example, in one example, a material of the diffusing agent includes at least one of organosilane and silicon dioxide, that is, the diffusing agent added in the cover plate 105 can be organosilane, or silicon dioxide, or a mixture of organosilane and silicon dioxide. Of course, the diffusing agent can further include other materials that can adjust the white light chromaticity of the first type display panel 103 and the haze of the display picture, which is not limited in the embodiment of the present disclosure.

For example, in a case where light passes through the diffusing agent in the cover plate 105, the light will be reflected and refracted, and the light will have lost, which will cause a color of a color coordinate to change. The higher the concentration of the diffusing agent, the smaller the X/Y coordinates, and the bluer the color of the light; the lower the concentration of the diffusing agent, the larger the X/Y coordinates, and the redder the color of the light, and therefore, the concentration of the diffusing agent in the cover plate cannot be too high, or be too low.

Figure 9:
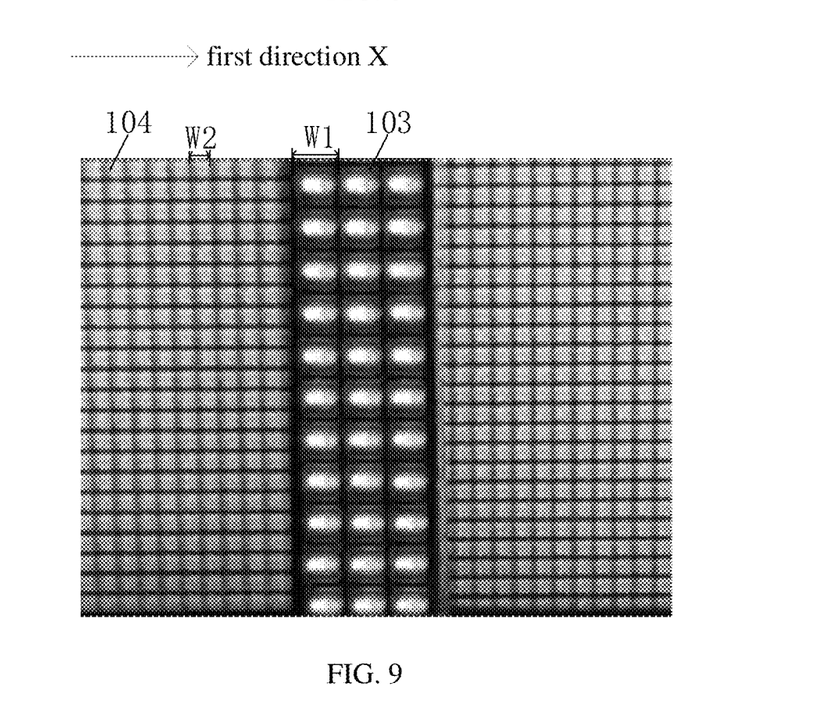
FIG. 9 is a comparative schematic diagram of pixels of a first type display panel and a second type display panel provided by at least one embodiment of the present disclosure.

For example, in an example, the light-emitting device 1032 is a Mini LED. FIG. 9 is a comparative schematic diagram of pixels of a first type display panel and a second type display panel provided by at least one embodiment of the present disclosure, in a first direction X parallel to the light-emitting surface of the display module 100, a width W1 of each pixel unit in the first type display panel 103 is 1 time to 2 times a width W2 of each pixel unit in the second type display panel 104. As illustrated in FIG. 9, in the first direction X, the width W1 of each pixel unit in the first type display panel 103 is 2 times the width W2 of each pixel unit in the second type display panel 104, the embodiments of the present disclosure are not limited to this. In the first direction X, the width W1 of each pixel unit in the first type display panel 103 may further be 1.2 times, 1.5 times, or 1.8 times the width W2 of each pixel unit in the second type display panel 104, or, in the first direction X, the width W1 of each pixel unit in the first type display panel 103 may be equal to the width W2 of each pixel unit in the second type display panel 104.

For example, in one example, in the first direction X, the width W1 of each pixel unit in the first type display panel 103 is a distance that subtract 0.1 mm to 0.5 mm from the distance between two of the second type display panels 104 adjacent to each other in the first direction X. In FIG. 9, three pixel units of the first type display panel 103 are between two second type display panels 104 adjacent to each other, and there are gaps among the three pixel units.

For example, in one example, each pixel unit in the first type display panel 103 includes a plurality of sub-pixels, a distance between two adjacent second type display panels 104 in the first direction is 2 to 5 times a width of the sub-pixel in the first direction plus 0.2 mm to 0.6 mm, and this distance design can make the display effect of the display module 100 be best. In a case where the distance between two adjacent second type display panels 104 in the first direction X is too large, picture defects such as large-angle black borders may exist, and in a case where the distance between two adjacent second type display panels 104 in the first direction X is too small, design space of the Mini LED circuit board may be insufficient, which will affect a reliability of the Mini LED circuit board.

For example, in one example, the Mini LED includes a red chip, a green chip and a blue chip, and the blue chip has the same dominant wavelength as the backlight module 107 in the second type display panel 104, that is, the backlight module 107 in the second type display panel 104 also uses a blue light-emitting diode.

For example, in one example, a wavelength of the light emitted from the red chip is 620 nm to 650 nm, a wavelength of the light emitted from the green chip is 520 nm to 550 nm, and a wavelength of the light emitted from the blue chip is 440 nm to 470 nm. The light emitted from the blue chip has the same dominant wavelength as the light emitted from the light-emitting diode in the second type display panel, so as to ensure consistency of the chromaticity of a blue picture between a Mini LED display unit and the second type display panel. The wavelength of the red chip and the wavelength of the green chip are selected according to a result of the red dominant wavelength and the green dominant wavelength after the light-emitting diode in the second type display panel matching with the color filter, which are not limited in the embodiments of the present disclosure.

For example, in an example, a current value of the red chip:a current value of the green chip:a current value of the blue chip is 1~1.8:0.8~1.2:0.9~1.4. For example, the current value of the red chip:the current value of the green chip:the current value of the blue chip is 1:0.8:0.9; or, the current value of the red chip:the current value of the green chip:the current value of the blue chip 1.2:1:1.2; or, the current value of the red chip:the current value of the green chip:the current value of the blue chip is 1.6:1.1:1.3; or, the current value of the red chip:the current value of the green chip:the current value of the blue chip is 1.8:1.2:1.4; or, in an example, the current value of the red chip:the current value of the green chip:the current value of the blue chip is 1.6:1:1.15.

For example, in one example, the chromaticity of the second type display panel 104 is X=0.28±0.01, Y=0.29±0.01, the wavelength of the blue chip of the Mini LED is 455 nm, and the wavelength of the red chip is 625 nm, the wavelength of the green chip is 525 nm, correspondingly, the driving current of the Mini LED is 1.6 mA for the red chip, 1 mA for the green chip, and 1.15 mA for the blue chip.

Figure 10:
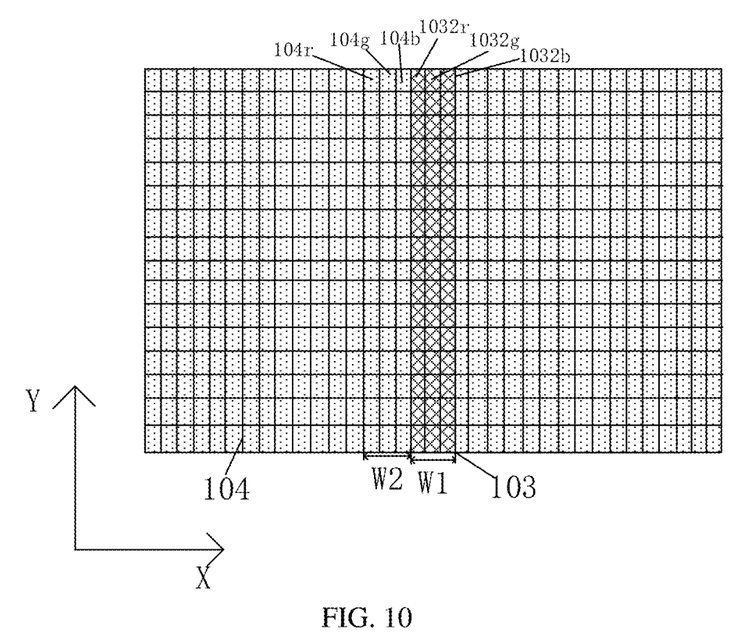
FIG. 10 is a plane structure schematic diagram of a first type display panel with a display device of a Micro LED provided by at least one embodiment of the present disclosure.

For example, in an example, the light-emitting device 1032 in the first type display panel 103 can further be a Micro LED or a Mini OLED. For example, FIG. 10 is a plane structure schematic diagram of a first type display panel with a display device of a Micro LED provided by at least one embodiment of the present disclosure, as illustrated in FIG. 10, in the first direction X parallel to the light-emitting surface of the display module 100, the width W1 of each pixel unit in the first type display panel 103 is equal to the width W2 of each pixel unit of the second type display panel 104, and the sub-pixel in the light-emitting device 1032 corresponds to the sub-pixel in the second type display panel 104 one by one. That is, one sub-pixel in one light-emitting device 1032 corresponds to one sub-pixel in one second type display panel 104. For example, in one example, in the first direction X, it is assumed that the sub-pixels in the second type display panel 104 are arranged sequentially in an order of a red sub-pixel 104r, a green sub-pixel 104g and a blue sub-pixel 104b, in the first direction X, the red sub-pixel 1032r, the green sub-pixel 1032g and the blue sub-pixel 1032b are also arranged sequentially in the light-emitting device 1032. In this way, the light emitted from the first type display panel 103 and the light emitted from the second type display panel 104 can display in the same color sequence, which further reduces a brightness difference between the display picture of the first type display panel 103 and the display picture of the second type display panel 104.

For example, the second direction Y intersects with the first direction X. In an example, the second direction Y is perpendicular to the first direction X. In the second direction, one sub-pixel in one light-emitting device 1032 also corresponds to one sub-pixel in one second type display panel 104, and adjacent sub-pixels display different colors.

Figure 11:
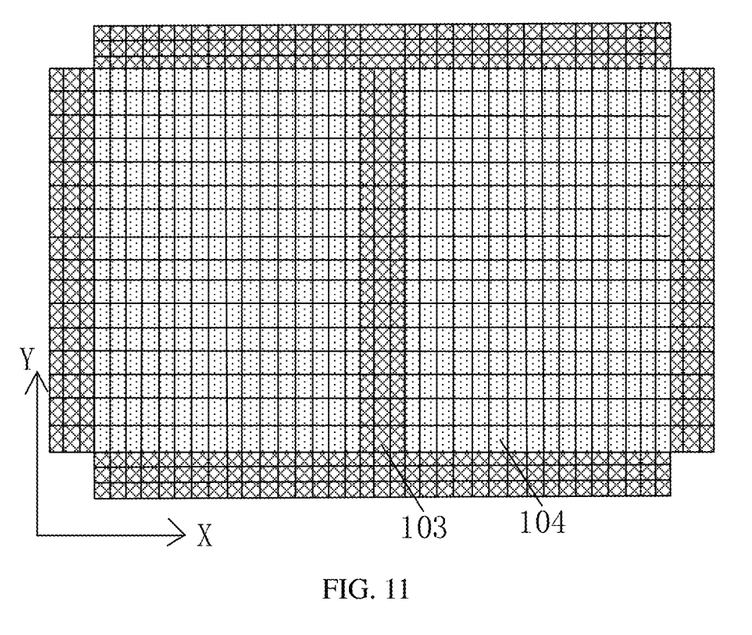
FIG. 11 is a plane structure schematic diagram of another first type display panel with a display device of a Micro LED provided by at least one embodiment of the present disclosure.

For example, FIG. 11 is a plane structure schematic diagram of another first type display panel with a display device of a Micro LED provided by at least one embodiment of the present disclosure. As illustrated in FIG. 11, a first type display panel 103 is further provided on an outside edge of the second type display panel 104, so as to make the display effect of the display module better.

For example, for the structure of the cover plate, please refer to relevant descriptions for that the display device in the first type display panel is the Mini LED mentioned above, which will not be repeated herein.

For example, for the structure that the display device in the first type display panel is a Mini OLED, please refer to the relevant descriptions for that the display device in the first type display panel is the Micro LED mentioned above, which will not be repeated herein.

In summary, the first type display panel 103 can be a Micro LED (Micro Light-Emitting Diode) display panel, a Mini LED (Mini Light-Emitting Diode) display panel or a Mini OLED (Mini Organic Light-Emitting Diode, organic electroluminescent light-emitting device) display panel. The embodiments of the present disclosure can realize a seamless splicing of multiple types of second type display panels by setting the first type display panel in the splicing display region, thereby continuously expanding an application field of the display module. It should be noted that, in order to control the first type display panel to display pictures, a corresponding driving circuit and a control chip can be provided in the non-display region of the second type display panel.

At least one embodiment of the present disclosure further provides a splicing screen, which includes a plurality of connected display modules as described in any one of the above embodiments. For example, FIG. 12 is a cross-sectional structure schematic diagram of a splicing screen provided by at least one embodiment of the present disclosure, as illustrated in FIG. 12, the splicing screen 20 includes a plurality of display modules 100 provided by any one of the embodiments mentioned above, although it is illustrated in FIG. 12 that the splicing screen 20 includes a splicing screen formed by splicing nine display modules 100, however, the embodiments of the present disclosure are not limited to this, and may further include other numbers of display modules 100, for example, 2, 4, 6, 12 and so on.

Figure 12:
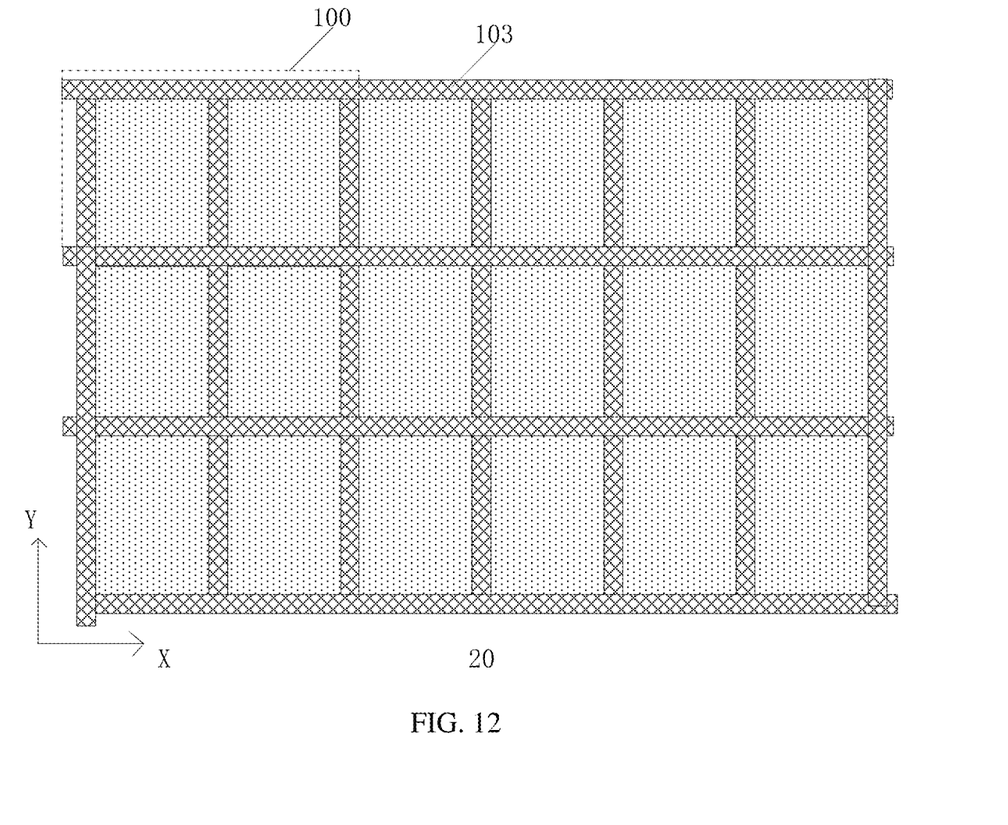
FIG. 12 is a cross-sectional structure schematic diagram of a splicing screen provided by at least one embodiment of the present disclosure.

For example, as illustrated in FIG. 12, a width direction of each pixel unit in the first type display panel 103 is the first direction X, and an extension direction of the splicing seam between adjacent second type display panels 104 is the second direction Y. In the second direction Y, the first type display panel 103 is divided into a plurality of first type sub-display units, and a length of each first type sub-display unit in the second direction Y is 50 mm to 150 mm.

For example, a display unit that is too long is easy to warp, which affects an assembly of the splicing screen, and a display unit that is too short will make an assembly process more complicated due to an excessive number of display units, thus affecting an assembly efficiency of the splicing screen.

For example, in one example, a package pitch of the Mini LED is 1.26 mm, a width of the Mini LED display unit is 3.9 mm, and the length of the first type sub-display unit in the second direction Y is 80 mm to 100 mm, for example, in a structure illustrated in FIG. 12, the first type display panel 103 can be divided into 19 first type sub-display units in the second direction Y.

For example, as illustrated in FIG. 12, the first type display panel 103 is further arranged around the splicing screen 20.

At least one embodiment of the present disclosure further provides a display apparatus, the display apparatus includes the display module described in any one of the embodiments mentioned above. For example, the display apparatus in the embodiments of the present disclosure may be any products or components with a display function such as a monitor, an OLED panel, an OLED TV, an electronic paper, a mobile phone, a tablet computer, a notebook computer, a digital photo frame, and a navigator.

The display module, the splicing screen and the display apparatus provided by at least one embodiment of the present disclosure have at least one of the following beneficial technical effects:

(1) In the display module provided by at least one embodiment of the present disclosure, the surface of the cover plate close to the first type display panel includes the first surface that protrudes to the side away from the first type display panel, and the surface of the cover plate away from the first type display panel is the flat second surface, which can increase the viewing angle of the display module, and the flat second surface can further make the appearance of the finally formed display apparatus more beautiful.

(2) In the display module provided by at least one embodiment of the present disclosure, the cover plate can prevent the first type display panel from being scratched or collided by the external rigid substance, which may cause the first type display panel to be damaged.

(3) In the display module provided by at least one embodiment of the present disclosure, a diffusing agent is added to the cover plate, and the diffusing agent can improve the white light chromaticity of the first type display panel and the haze of the display picture, so that the display picture of the first type display panel can be better matched with the display picture of the second type display panel.

The following points need to be explained:

(1) In the drawings of the embodiment of the present disclosure, only the structure related to the embodiment of the present disclosure is involved, and other structures can refer to the general design.

(2) In case of no conflict, features in the same embodiment and different embodiments of the present disclosure can be combined with each other.

What has been described above is only an exemplary embodiment of the present disclosure, and is not used to limit the protection scope of the present disclosure, which is determined by the appended claims.

The invention claimed is:

1. A display module, comprising: at least two main display regions and a splicing display region, wherein at least a part of the splicing display region is located between two of the main display regions adjacent to each other on a side of a light-emitting surface of the display module;
   a first type display panel is arranged in the splicing display region, and a second type display panel is arranged in the main display regions;
   on the side of the light-emitting surface of the display module, at least a cover plate is arranged on the first type display panel, and a surface of the cover plate close to the first type display panel comprises a first surface protruding to a side away from the first type display panel, and a surface of the cover plate away from the first type display panel is a flat second surface,
   wherein the first surface is a surface with a circular arc, the smaller a radius of the circular arc, the greater an angle between emitting light and a direction perpendicular to a light-emitting surface of the first type display panel.

2. The display module according to claim 1, wherein the display module further comprises a first polarizer and a backlight module, the first polarizer is on a side of the second type display panel close to the light-emitting surface of the display module, and the backlight module is on a side of the second type display panel away from the first polarizer.

3. The display module according to claim 2, wherein roughness of the second surface is the same as roughness of the first polarizer.

4. The display module according to claim 3, wherein the first polarizer has a smooth structure, and the second surface is a smooth plane.

5. The display module according to claim 3, wherein the first polarizer is a structure with a haze, and the second surface is a flat plane with frosting.

6. The display module according to claim 1, wherein the cover plate further covers the second type display panel.

7. The display module according to claim 1, wherein the cover plate is provided with a diffusing agent, the diffusing agent is configured to adjust white light chromaticity of the first type display panel and a haze of a display picture.

8. The display module according to claim 7, wherein a material of the diffusing agent comprises at least one of organosilane and silicon dioxide.

9. The display module according to claim 1, wherein the radius of the circular arc is 3 mm to 10 mm.

10. The display module according to claim 1, wherein an average thickness of the cover plate is 1 mm to 2 mm in a direction perpendicular to the light-emitting surface of the display module.

11. The display module according to claim 1, wherein the first type display panel comprises a driving circuit and a light-emitting device, the light-emitting device is arranged on the side of the light-emitting surface of the display module, the driving circuit is arranged on a side opposite to the light-emitting surface, and the driving circuit is configured to drive the light-emitting device to emit light.

12. The display module according to claim 11, wherein the light-emitting device is a Mini LED, in a first direction parallel to the light-emitting surface of the display module, a width of each pixel unit in the first type display panel is 1 time to 2 times of a width of each pixel unit in the second type display panel.

13. The display module according to claim 12, wherein in the first direction, the width of each pixel unit in the first type display panel is twice the width of each pixel unit in the second type display panel.

14. The display module according to claim 12, wherein in the first direction, the width of each pixel unit in the first type display panel is a distance that subtract 0.1 mm to 0.5 mm from the distance between two of the second type display panels adjacent to each other in the first direction.

15. The display module according to claim 12, wherein each pixel unit in the first type display panel comprises a plurality of sub-pixels, and a distance between two adjacent second type display panels in the first direction is 2 to 5 times a width of the sub-pixel in the first direction plus 0.2 mm to 0.6 mm.

16. A splicing screen, comprising a plurality of connected display modules according to claim 1.

17. The splicing screen according to claim 16, wherein a width direction of each pixel unit in the first type display panel is a first direction, and an extension direction of a splicing seam between adjacent second type display panels is a second direction, along the second direction, the first type display panel is divided into a plurality of first type sub-display units, a length of each first type sub-display unit in the second direction is 50 mm to 150 mm.

18. The splicing screen according to claim 17, wherein the first type display panel is arranged around the splicing screen.

19. A display apparatus, comprising the display module according to claim 1.

* * * * *